United States Patent
Lueders

[11] Patent Number: 6,028,591
[45] Date of Patent: *Feb. 22, 2000

[54] KEYBOARD WITH FLEXIBLE DISPLAY AND PROMPT CAPABILITY

[75] Inventor: William R. Lueders, McKinney, Tex.

[73] Assignee: Texas Instruments Incorporated, Dallas, Tex.

[ * ] Notice: This patent is subject to a terminal disclaimer.

[21] Appl. No.: 07/853,356

[22] Filed: Mar. 16, 1992

Related U.S. Application Data

[63] Continuation of application No. 07/754,360, Aug. 29, 1991, abandoned, which is a continuation of application No. 07/658,420, Feb. 20, 1991, abandoned, which is a continuation of application No. 07/279,240, Nov. 30, 1988, abandoned, which is a continuation of application No. 07/170,603, Mar. 14, 1988, abandoned, which is a continuation of application No. 06/900,668, Aug. 27, 1986, abandoned.

[51] Int. Cl.⁷ ...................................... G09G 3/00
[52] U.S. Cl. ......................... 345/156; 345/157; 345/173; 345/87; 345/104
[58] Field of Search ................... 340/711, 712, 340/365 VC, 365 A; 341/22, 23; 200/5 A, 959 B, 313, 314, 511, 512; 178/18, 18.01, 18.03, 18.05–18.08; 345/156, 157, 168, 169, 172, 173, 102, 901, 902, 903, 104, 87, 179; 349/41, 122

[56] References Cited

U.S. PATENT DOCUMENTS

| | | | |
|---|---|---|---|
| 3,464,531 | 9/1969 | Herr et al. | 340/365 A |
| 3,732,389 | 5/1973 | Kaelin et al. | 340/365 A |
| 3,956,745 | 5/1976 | Ellis | 340/365 VL |
| 3,971,013 | 7/1976 | Challoner et al. | 340/365 C |
| 4,022,993 | 5/1977 | Shattuck | 200/5 A |
| 4,078,257 | 3/1978 | Bagley | 340/365 VL |
| 4,202,041 | 5/1980 | Kaplow et al. | 340/712 |
| 4,224,615 | 9/1980 | Penz | 350/334 |
| 4,274,093 | 6/1981 | Judge | 340/712 |
| 4,317,012 | 2/1982 | Itoh | 200/511 |
| 4,336,530 | 6/1982 | Koike et al. | 345/169 |
| 4,403,965 | 9/1983 | Hawkins | 434/339 X |
| 4,527,862 | 7/1985 | Arakawa | 349/122 |
| 4,553,820 | 11/1985 | Harada | 349/41 |
| 4,561,044 | 12/1985 | Ogura et al. | 345/102 |
| 4,723,836 | 2/1988 | Kono et al. | 345/104 |
| 4,730,186 | 3/1988 | Koga et al. | 345/179 |
| 4,785,564 | 11/1988 | Gurtler | 345/104 |
| 4,789,858 | 12/1988 | Ferguson et al. | 340/784 |
| 4,885,580 | 12/1989 | Noto et al. | 340/711 X |
| 4,948,232 | 8/1990 | Lange | 345/50 |

FOREIGN PATENT DOCUMENTS

| | | |
|---|---|---|
| 59-118347 | 6/1984 | Japan . |
| 59-165062 | 8/1984 | Japan . |
| 59-246414 | 11/1984 | Japan . |
| 59-270964 | 12/1984 | Japan . |
| 1501125 | 2/1978 | United Kingdom . |
| 1582941 | 1/1981 | United Kingdom ................... 340/712 |
| 85/02703 | 6/1985 | WIPO . |

OTHER PUBLICATIONS

Bush et al, "EMI/RFI Protective Envelope for Membrane Switches", IBM Technical Disclosure Bulletin, vol. 27, No. 7A, Dec. 1984, pp. 3947–3949.

Ghosh et al, "Electronically Changeable Keyboard Key Inscriptions", IBM Technical Disclosure Bulletin, vol. 23, No. 3, Aug. 1980, pp. 1190–1193.

*Primary Examiner*—Richard A. Hjerpe
*Attorney, Agent, or Firm*—Ronald O. Neerings; Richard L. Donaldson

[57] ABSTRACT

A keyboard (10) is disclosed including a flexible display membrane (36) overlying a plurality of pressure-responsive switches (28). The display membrane (36) can be electrically addressed to display location indicia (48) indicating the position of an underlying switch (46), and functional indicia (50) indication the function of the key (46). Informational text (58) can also be displayed on the flexible display (36) indicating the choice of switches to effect a desired function. An interactive exchange of information between the keyboard user and a processing system (14) can be achieved to accomplish a desired function. Graphical information can be input to the processing system (14) by an array (90) of pressure-responsive elements (91). Graphics input by the array (90) can be reproduced on an overlying portion (96) of the flexible display membrane (36).

22 Claims, 2 Drawing Sheets

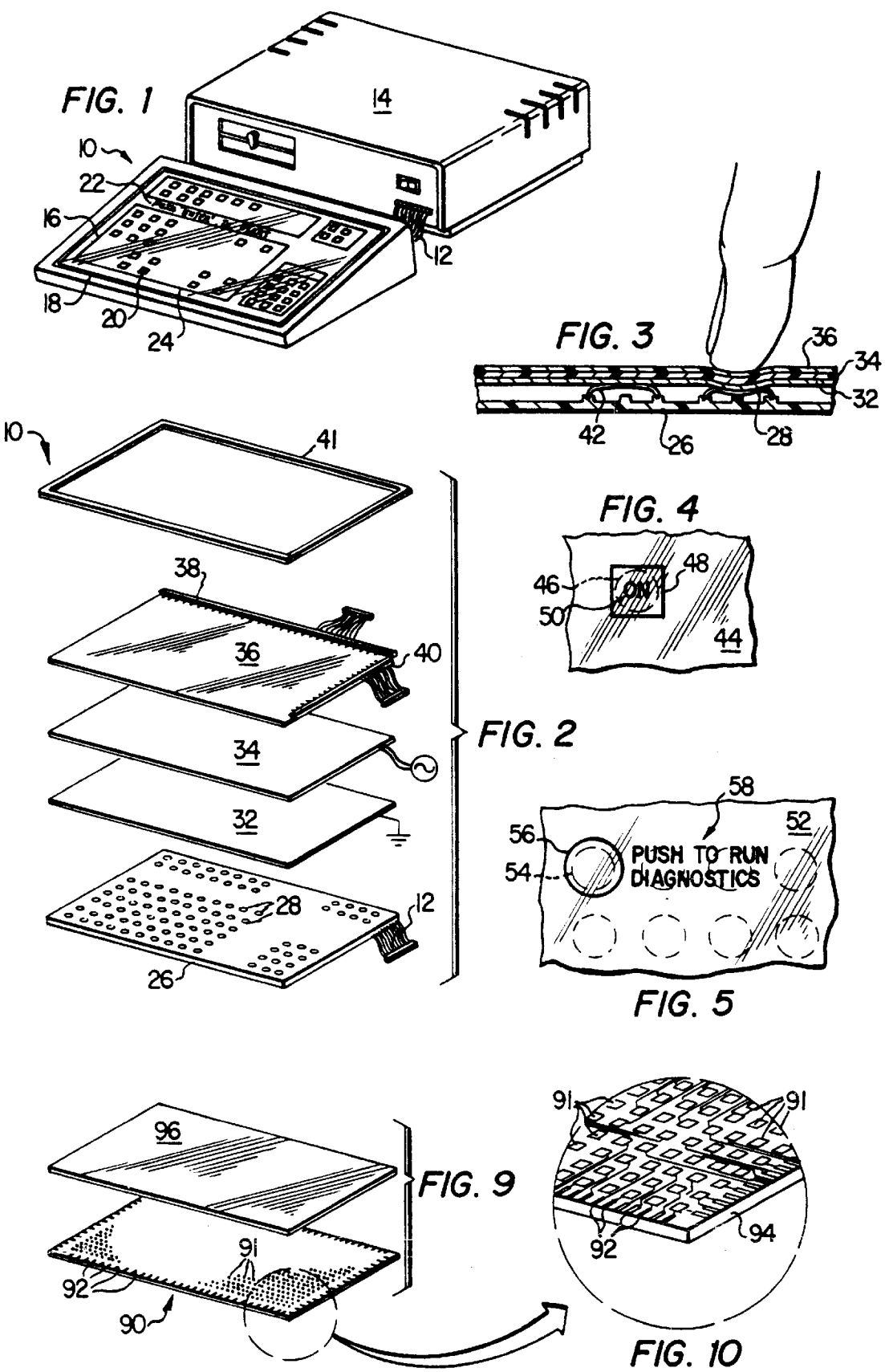

KEYBOARD WITH FLEXIBLE DISPLAY AND PROMPT CAPABILITY

This application is a continuation of application Ser. No. 07/754,360, filed Aug. 29, 1991, now abandoned, which is a continuation of Ser. No. 07/658,420, filed Feb. 20, 1991, now abandoned, which is a continuation of Ser. No. 07/279, 240, filed Nov. 30, 1988, now abandoned, which is a continuation of Ser. No. 07/170,603, filed Mar. 14, 1988, now abandoned, which is a continuation of Ser. No. 06/900, 668, filed Aug. 27, 1986, now abandoned.

TECHNICAL FIELD OF THE INVENTION

The present invention relates in general to electrical control panels, and more particularly relates to programmable keyboards.

BACKGROUND OF THE INVENTION

Control panels are utilized in general for providing a means by which an operator can control or monitor mechanical and electrical apparatus. Such panels are generally equipped with manual switches for operating or regulating other equipment. Each switch or manual control is permanently labeled with regard to its particular function, thus affording the operator with an easy identification of the function of the switch.

Control panels of the keyboard type used with computers generally include the standard typewriter key layout, as well as many other special function keys. The identification of the keys, or the key functions, are typically engraved or labeled on the keys to allow the operator and those unfamiliar with the keyboard ease of entry of data into the processing system. It is common to mark certain keys with nonspecific designations, and to program the computer so that such keys can be used to provide a function in accordance with their programmed nature. The operator must either remember the special function of the nonspecifically identified keys, or be provided with an overlay cover or card which uniquely identifies the keys with respect to their currently programmed function.

Other types of keyboards, such as those used in case registers or similar equipment, are provided with a flexible cover on which an identification of the underlying keys is fixed. With this type of arrangement, the operator simply presses a permanently outlined area having the function identified thereon for accomplishing the desired result.

While the foregoing types of control panels are effective for their intended purposes, it is difficult to change the designations or identifications of the various keys without having to use an entirely new template, or requiring the operator to remember new or additional functions of the keys. Also, control panels and keyboards heretofore known in the art are used primarily for the one-way flow of information, e.g., from the operator to the processing system.

It can be seen that a need exists for a control panel with a programmable overlay display which uniquely identifies each switch, and which can be program controlled to automatically change the switch identification as the operator progresses in performing a programmed function. A need also exists for a keyboard display of information generated by the processing system, so that the operator can input information to the processing system, and the processing system can provide prompting information or instructions on the keyboard to the operator. A concomitant need also exists for a less complicated keyboard system in which only those switches are identified which are pertinent to a particular function or operation, such that the operator is not aware of the existence of the other keys whose functions are irrelevant to the particular operation.

SUMMARY OF THE INVENTION

In accordance with the present invention, an improved control panel is disclosed which reduces or eliminates the disadvantages and shortcomings associated with the prior art control panels and keyboards. The control panel of the invention comprises a standard alphanumeric set of keys, in addition to various other special use or function keys. A flexible liquid crystal membrane display overlies all of the keyboard keys, thereby obscuring the keys from the operator. The flexible keyboard display includes an array of addressable pixels for generating key identification indicia and instructions on the face of the membrane. The liquid crystal membrane is driven by a processing system which receives the keyboard information in response to key depressions.

The keyboard display of the invention provides the advantage of allowing the user to be interactive with the processing system, such that in response to various key depressions, the processing system causes instructions to be displayed concerning options selectable by the operator to complete the operation. Only the pertinent keys need be identified and selectively or optionally operated by the operator. The pertinent keys are identified at the respective positions on the display overlying the keys, whereupon the operator simply pushes on the flexible display at the point identified and the underlying electrical switch is operated. In those places on the display where no underlying switches are identified, text in the nature of alphanumerics may be displayed for instructional purposes.

In the preferred form of the invention, a conventional keyboard switch arrangement may be utilized, including pressure responsive switches, such as the membrane type having a tactile feel. An electromagnetic shield of a flexible foil overlies the keyboard switches to prevent electrical interference from being induced into or from the switches. When the display membrane is of the liquid crystal type, backlighting may be desirable to enhance the contrast of the alphanumerics generated by the processing system on the face of the display. A flexible electroluminescent panel may thus be placed over the electromagnetic shield to provide a background ambient light. The electromagnetic shield prevents ac signals driving the electroluminescent display from being induced into the keyboard switches. Lastly, a flexible display membrane, such as a liquid crystal display, is placed over the electroluminescent backlighting panel. The liquid crystal display membrane can be depressed by the operator, whereupon an underlying keyboard switch will be depressed and actuated.

The liquid crystal display membrane obscures the underlying keyboard switches until the processing system addresses the display to generate a template identifying the relevant switches and their functions. A switch may be identified by forming a circle or square on the display at a location in vertical registry over the underlying switch. Alphanumerics may be generated on the display to provide the function of the key. On each depression of a switch selected by the operator, the processing system may generate an entirely new template, giving the operator new options to select for accomplishing the desired function. A keyboard is thus provided with the technical advantages of allowing interaction between the processing system and the operator, without the need for a conventional cathode ray tube display device.

According to another feature of the invention, the control panel may include an array of pressure sensitive dots which respond to a graphical input by the operator, such as by a pencil sketch across the array. The graphical information can thus be input into the processing system. As the operator draws across the array, a small voltage is generated across each compressed dot, thereby providing the processing system with information concerning the pertinent dots pressed as a result of the drawing or sketch. The dot array is similar to a scratch pad to input graphical information into the processing system.

BRIEF DESCRIPTION OF THE DRAWINGS

Further features and advantages will become more apparent from the following and more particular description of the preferred embodiment of the invention, as illustrated in the accompanying drawings in which like reference characters generally refer to the same parts throughout the views, and in which:

FIG. 1 illustrates a processing system including a processor and a keyboard constructed according to the invention;

FIG. 2 shows in exploded form the major components of the programmable display and keyboard of the invention;

FIG. 3 is a cross-sectional view of a portion of the keyboard, illustrating the depression of the display membrane to actuate the underlying keyboard key;

FIGS. 4 and 5 illustrate respectively key location and identification indicia displayed on the flexible display, and instructional text;

FIG. 9 shows a scratch pad portion of the keyboard constructed with a two-dimensional array of small pressure sensitive elements; and FIG. 10 illustrates an enlarged section of the array of FIG. 9.

DETAILED DESCRIPTION OF THE INVENTION

Figure 6:
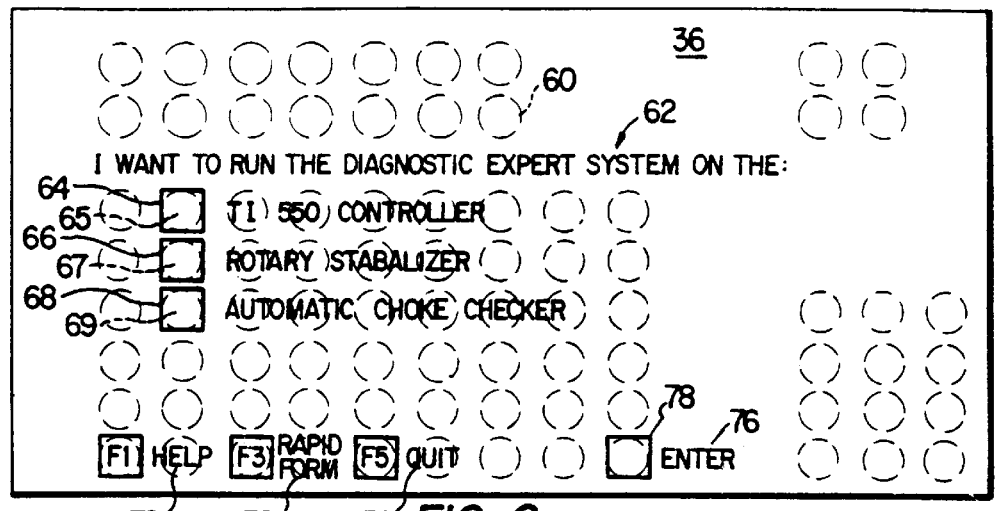
FIGS. 6–8 illustrate a display sequence of the interaction between a keyboard operator and a processing system.

A typical application of the invention is illustrated in FIG. 1 of the drawings. FIG. 1 illustrates a control panel, or keyboard 10, connected by a conductor cable 12 to a digital processor 14. The processor 14 may be equipped with a cathode ray tube (CRT) display (not shown), but such a display is not entirely necessary when the processor 14 is used in conjunction with the keyboard 10 of the invention. While the processor 14 may be of the program controlled type, other less-sophisticated systems, such as machinery and appliance control panels or the like, may employ the various features and advantages of the invention.

The keyboard 10 is shown in FIG. 1 with a template or display 16 having a key outline 18 and a key location 20 generated on the display 16. The actual keys which are depressed underlie the display 16, and thus cannot be seen by the keyboard user. The display 16 is flexible so that when pressed, such as at the key location outlined by reference character 20, the underlying key is correspondingly depressed. According to the programmable nature of the display 16, locations 20 of underlying keys can be displayed for pertinent keys used in performing a particular function, and may be left vacant or blank at other key locations to simplify the operation of the keyboard. Also, the display 16 can be driven by the processor 14 to display informational text 22 so that the operator can interact with the processor 14. A family of keys may be outlined by a visual line 24 to assist the operator in finding pertinent keys, based upon the desired function of the keys. Visual line 24, key locations 20 and text 22 may be changed as the operator proceeds with different functions and operations. A programmable template for the underlying keys is thus provided for giving visual indications on the display of both the position and function of the keyboard switches.

FIG. 2 is an exploded view of the major components of the keyboard 10 of the invention. In the preferred embodiment of the invention, the keyboard 10 includes a printed circuit board 26 on which a plurality of electrical switches 28 are mounted. The switches 28 are pressure responsive so that when mechanically depressed, an indication of a closure is transmitted to the processor 14 by the cable 12. Of course, switches 28 may also be operable by techniques such as capacitance sensing and the like. While FIGS. 1 and 2 are only illustrative of the principles and concepts of the invention, it should be understood that the processor 14 may be located within the keyboard 10, or the keyboard itself may also be processor controlled.

According to one embodiment of the invention, the switches 28 are tactile membrane type of switches which are commercially available. A conductive foil forming a static or electromagnetic shield 32 is positioned over the printed wire board 26 to completely cover the key switches and associated circuits. The static shield 32 is preferably connected to a ground potential, thereby protecting the underlying circuits from electromagnetic interference.

A flexible electroluminescent panel 34 is fixed over the static shield 32 for providing an ambient backlight. The electroluminescent panel is typically illuminated by an ac voltage, ranging from 20 to over 400 volts RMS. Inverters are conventionally available for converting logic circuit dc supply voltages to these ac voltages. The static shield 32 functions to isolate the circuits of the printed wire board 26 from electromagnetic interference which can be generated by the electroluminescent panel 34. Flexible electroluminescent panels suitable for use with the present invention are available from Luminescent Systems, Inc., Etna Road, Lebanon, N.H.

A flexible display 36 is fixed over the electroluminescent panel 34. The flexible display 36 can cover all, or a portion of, the keyboard keys 28, and may be selectively illuminated at desired positions to identify underlying switches 28. A flexible plastic liquid crystal display 36 is preferable for use with the invention. Such type of display is obtainable from the Polaroid Corporation, Norwood, Mass. Liquid crystal displays are typically constructed having a matrix of electrically addressable elements disposed with a clear organic material which can become reflective or opaque in the vicinity of an addressed element. Thus, when a plurality of such elements are addressed to form a pattern, such as an alphabet or a numeral, the light incident to the display will be transmitted therethrough, except in the regions proximate the addressed elements. Liquid crystal displays are particularly applicable for use with the invention, as such devices are flexible, are operated at a low voltage and consume little power.

The pixel elements of the liquid crystal display are addressable, much like a memory, through a plurality of electrical row connections 38 and a plurality of electrical column connections 40. Drivers suitable for use in decoding and driving the row and column connections 38 and 40 are identified as integrated circuit types HD61103A, manufactured by the Harris Semiconductor Company.

A frame 41 is employed to peripherally clamp the flexible display 36, the backlighting panel 34 and the static shield 32 in a sandwiched manner to the printed wire board 26. A rigid and durable keyboard is thus provided. In the event that it is desired to construct the keyboard 10 without the backlighting panel 34, the static shield 32 may also be eliminated.

FIG. 3 illustrates the physical deformation of the flexible display 36 by the finger of the operator, which causes the corresponding deformation of the backlighting panel 34 and the static shield 32 to actuate the underlying switch 28. An adjacent, or neighboring switch 42 is not affected by the depression of the display membrane 36 section overlying switch 28. As is known, switch 28 includes a flexible upper portion which is normally spaced from an underlying contact. Depression of the upper portion into abutment with the contact causes an electrical closing of the switch 28.

FIG. 4 illustrates a section 44 of the display membrane addressed by the processor 14 for locating the position of an underlying switch 46. Particularly, various pixel elements of the display 36 are driven such that a box 48 is formed in the display section 44 directly overlying the switch 46. The display 36 can also be addressed to form switch function indicia 50. It can be appreciated that by simply programming the processor 14 to display desired functional indicia 50, such as the "ON" indication, the processor 14 can also carry out such function when the identified switch 46 is depressed. Thus, the number of functions which the keyboard can accommodate are endless, and the functions can be programmed with respect to any of the keys forming a part of the keyboard 10. In this manner, the keys of the keyboard 10 can be continuously reprogrammed to take into consideration ease of use by the keyboard user. For example, four centrally located keys easily accessed by one index finer of the user may be continuously programmed and reprogrammed to carry out numerous functions.

FIG. 5 illustrates a section 52 of the flexible display 36 which designates the position of an underlying switch 54 by displaying a round boundary 56. Informational text 58 directed to the keyboard user is also displayed. In other words, if the keyboard user desires to run a diagnostics program, display boundary 56 should be depressed, thereby actuating the underlying switch 54. When the processor senses depression of key 54 in this particular instance, a diagnostics program will be executed. After execution of the diagnostics program, in some instances a different informational text message 58 may be displayed to the operator by the processor, and different functions will then be accomplished upon depression of boundary 56.

Figure 7:
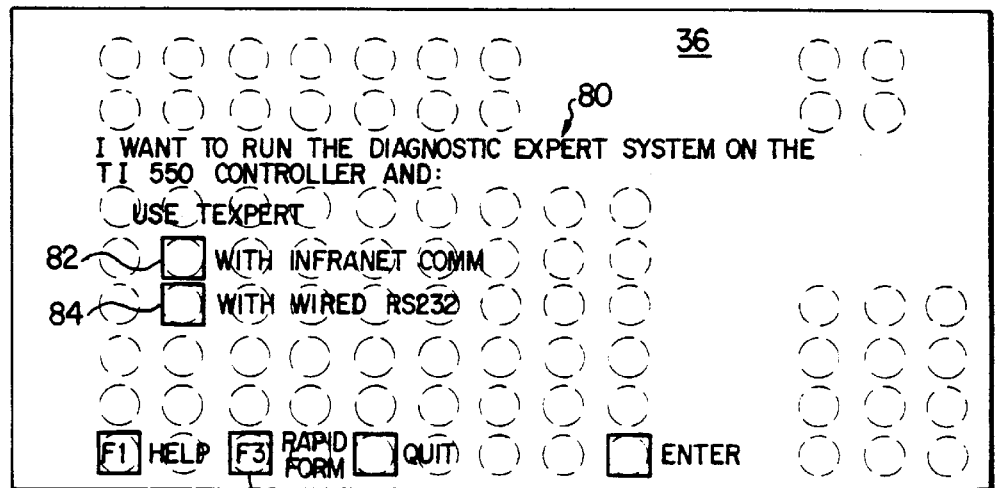
Figure 8:
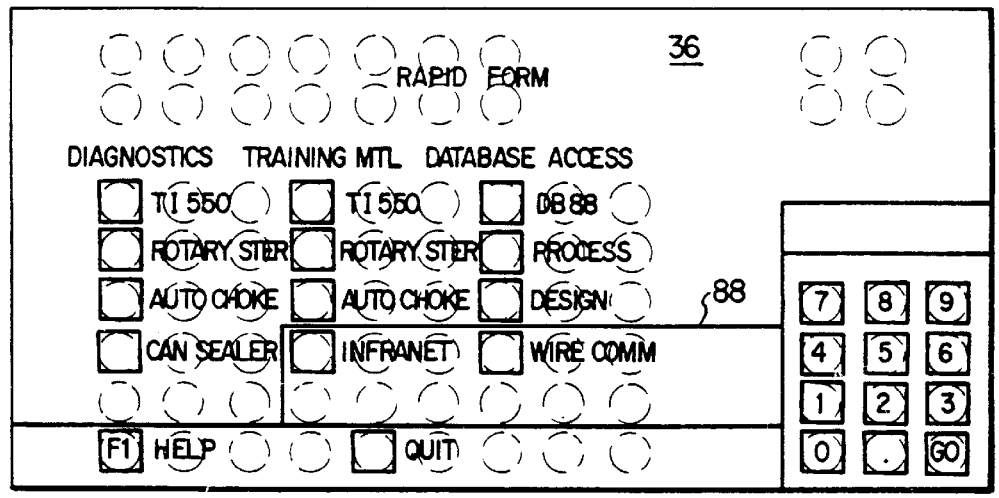

FIGS. 6–8 are illustrative of an example of the processor-user interaction for accomplishing a task. For example, and assuming the flexible display membrane 36 was depressed at location 56 in FIG. 5, the program controlled processor 14 would transmit signals to the keyboard 10 for displaying the switch positional information and instructional text information shown in FIG. 6. The circular broken lines, such as 60, depict underlying switches. The text 62 displayed on the flexible membrane is in the nature of a prompt, for soliciting from the keyboard user additional information which is necessary to perform the exemplary diagnostics program. The text 62 can be displayed at an area where there are no underlying keyboard switches, or where there are underlying switches which are not programmed to be pushed in response to the prompt text 62. Since the underlying switches 60 cannot be seen through the display membrane 36, any display area not overlying switches pertinent at the time can be used.

In the example of FIG. 6, the prompt text 62 solicits the user to enter information concerning the system on which the diagnostics are to be run. If the "TI 550 Controller" system is desired, the keyboard user will depress display area 64. The underlying switch 65 will be actuated and detected by the processor 14. On the other hand, if diagnostics are to be run on the "Rotary Stabilizer", the user will depress display area 66. Underlying switch 67 will thus be actuated. Lastly, if diagnostics are to be run on the "Automatic Choke Checker", display area 68 is depressed. The depression of area 68 causes switch 69 to be activated. Various other keys of the keyboard are shown programmed, and identified with respective functions 70–74, to assist the keyboard user in the interaction with the processing system 14. For example, after one of the display sections 64–68 have been selected, the information may be transmitted to the processing system 14 by depressing display section 78 to "enter" the data. Thus, if it is desired to run the diagnostics on the 550 controller, area 64 is pushed, and then area 78 is subsequently depressed to enter the data into the processor 14.

With reference to FIG. 7, and according to an illustrative program which controls the processing system 14, prompt text 80 is displayed on the flexible display membrane 36. It should be noted that the processing unit 14 recognizes the actuation of the switch underlying display area 64 (FIG. 6), and solicits from the user, by text 80, further information. In response to the prompt text 80, the user can depress display area 82 to select the use of "Texpert" with "Infranet Communications". In the alternative, if display area 84 is pressed, the "Wired RS-232" option is selected. It should be noted that the electrical switches underlying display areas 82 and 84 of FIG. 7 correspond to those of areas 66 and 68 of FIG. 6. However, the functions of the respective switches have been automatically reprogrammed by displaying new functional indicia. The processing system 14 processes the new data entered in accordance with the depression of the respective switches.

Assuming that display area 86, corresponding to a "Rapid form" function, has been pressed, a new menu of prompt information is displayed on the flexible membrane display 36, as shown in FIG. 8. In this programmed sequence, many more keys are identified. In addition, keyboard areas are identified by addressing the display 36 to form linear lines 88 around keys having a common function. In this programmed sequence, the processor system 14 requires the additional input of information by the keyboard user to perform the "Rapid Form" function.

The foregoing illustrates a few of the sequences which can transpire for the interactive communications between the keyboard user and the processing system 14 to accomplish a desired task. Of course, in order to complete a task or function, many keyboard keys may be used, together with many menus and instructional messages. It can also be appreciated that by the use of the present invention, the need for a CRT display is minimized, if not completely eliminated.

Also, while the keyboard display 10 is depicted herein in conjunction with a processing system 14 to automatically change the display, it may be used without a programmed processor, but yet have the capability to provide different displays. For example, should a relatively small number of different keyboard displays be desired, a manual switch can be employed to switch between such displays. A calculator, for instance, using the flexible keyboard of the invention could visually specify all the key designations and functions to provide routine calculator functions. A switch to a second mode of operation could provide more specific functions, such as specialized keyboard functions used by pilots in determining fuel burn, time of flight, windage, etc. As a result, where two calculators were heretofore required, only one could be used by manually switching it between the desired modes. For a small number of programmed display key locations and functions, a read only memory can be utilized with manual switching to display the different indicia. The read only memory would store those pixel locations on the display which would be addressed and energized to react with the ambient light and provide the desired key location or informational text.

In accordance with another feature of the invention, a scratch pad graphic input is provided by the keyboard 10. FIG. 9 illustrates an array 90 of pressure sensitive elements 91, each of which is connected to a pair of edge contacts 92. Thus, when a particular element 91 of the array 90 is depressed, a voltage is produced at the corresponding contacts. FIG. 10 illustrates an enlarged section of the array 90 of FIG. 9. As can be seen from the enlarged view, each array 90 element 91 is connected to a contact 92 on the top side of the array base 94, and to a second contact on the bottom side (not shown) of the base 94. The base 94 can be constructed of a flexible transparent or opaque material, or a rigid material. The array elements 91 are constructed of a plurality of piezoelectric members which can be used to produce an output voltage in response to a pressure input. Piezoelectric elements suitable for use in the array 90 may be obtained from the Pennwalt Corporation, King of Prussia, Pa.

The graphics input array 90 may be covered by a protective and durable film 96 so that the array elements are not damaged when a pencil, or similar object, is scribed across the surface of the array 90 to input the graphic information into the processing system 14. When used in connection with the flexible display membrane 36 described above, the protective cover 96 may comprise a portion of the display membrane 36.

A plurality of decoders (not shown) can be used to detect a voltage generated by each array element 91, in response to pressure applied thereto, and provide the processing system 14 with information concerning the location of each element in the array 90. Thus, when a plurality of elements are pressed, such as when drawing a line or character over the array 90, the positional information of each array element 91 pressed can be transmitted to the processing system 14 to thereby generate a signature or likeness of the graphic.

In accordance with another feature of the invention, when the flexible display membrane 96 overlies the graphic array 90, the processing system 14 can be made to reproduce such graphics on the display 96. In other words, a graphic entered into the processing system 14 by way of the array 90 can be verified by again reproducing the graphic on the display membrane 96. While the reproduction of the graphic need not be displayed in the area of the display membrane 96 overlying the array 90, it may be preferable to do so for comparison purposes.

The piezoelectric array, when constructed as a transparent flexible panel, can also be placed over the display membrane 36 without interfering with the operation of the display. In other words, any text displayed on the display can be seen through the piezoelectric panel 90. The piezoelectric panel can be adhered to the flexible display by a conventional adhesive or cement. The piezoelectric panel 90 can also be fastened to a solid or rigid base, such as glass. The piezoelectric array panel 90 can thus be adhered, either temporarily or permanently, to a keyboard or CRT to enter graphical data into a processing system.

As noted, piezoelectric films are available for providing an output voltage in response to an input pressure. Accordingly, it is envisioned that such films with large areas can be used under the flexible display 36 and replace switches 28 which require mechanical movement for actuation. As a result, an alternative keyboard is provided which has no mechanical switch actuation and thus has an enhanced reliability.

From the foregoing, it can be seen that an improved control panel or keyboard, is disclosed. The keyboard includes pressure responsive keys and an overlying flexible display membrane which is deformable so that when pressed and deformed, an underlying switch is activated. When used in conjunction with a processing system, the flexible display of the keyboard provides the technical advantage of being addressed for displaying locations and functions of the various underlying keys, as well as informational text for prompting or instructing the keyboard user. An interactive system is thus provided with the advantage of allowing the keyboard user and the processing system to exchange information to accomplish a desired task. One major advantage of the system is that, in many situations, a cathode ray tube display may not be necessary. Significant advantages are also provided because system cost and reliability are thus enhanced.

When the flexible display is constructed of a plastic liquid crystal display, an electroluminescent background light may be used to provide ambient light for the display. A static shield can be placed between the electroluminescent panel and the keyboard switches to reduce electromagnetic interference therebetween.

a graphic input, comprising an array of pressure sensitive elements can be used in conjunction with the flexible display, or other equipment, to provide a graphic information exchange between the keyboard user and the processing system.

While the preferred embodiment of the invention has been disclosed with reference to a specific keyboard, it is to be understood that many changes in detail may be made as a matter of engineering choices without departing from the scope of the invention as defined by the appended claims.

What is claimed is:

1. A device, comprising:
   a plurality of data generating elements individually operable and responsive to pressure; and
   an electrically programmable display covering said plurality of elements for providing visual indicia associated with said plurality of elements anywhere on said display and operative to flex sufficient to actuate at least one of said plurality of elements responsive to pressure exerted on said display.

2. The device of claim 1, wherein said data generating elements are electrical switches.

3. The device of claim 2, wherein said electrical switches are mounted on a printed circuit board.

4. The device of claim 2, wherein said electrical switches are operable through mechanical depression of the switches.

5. The device of claim 1, wherein said data generating elements form an array of pressure sensitive elements.

6. The device of claim 5, wherein said array of pressure sensitive elements are mounted on a printed circuit board.

7. The device of claim 1, including a flexible electroluminescent panel between said display and said pressure sensitive elements.

8. The device of claim 1, including a flexible electromagnetic shield between said display and said pressure sensitive elements.

9. The device of claim 7, including a flexible electromagnetic shield between said electroluminescent panel and said pressure sensitive elements.

10. The device of claim 1, wherein said display is a liquid crystal membrane display.

11. The device of claim 1, wherein said display is adapted for displaying alphanumeric characters.

12. The device of claim 1, wherein said display is adapted for displaying graphical subject matter.

13. The device of claim 1, including a processor for supplying signals for changing the indicia displayed on said display in response to a program.

14. The device of claim 13, wherein said processor is programmable for identifying on said display desired underlying pressure sensitive elements and for displaying alphanumeric instructional indicia.

15. The device of claim 2, wherein said switches are of the membrane type.

16. A device, comprising:

a plurality of data generating elements individually operable and responsive to pressure;

an electrically programmable display covering said plurality of elements flexible sufficient to actuate at least one of said plurality of elements responsive to pressure exerted on said display; and means for apply signals to said display for providing visual indicia associated with said plurality of elements anywhere on said display.

17. The device of claim 16, wherein said means is a processor.

18. The device of claim 16, wherein said display is adapted for displaying alphanumeric characters.

19. The device of claim 16, wherein said display is adapted for displaying graphical subject matter.

20. The device of claim 17, wherein said processor is programmable for identifying on said display desired underlying pressure sensitive elements and for displaying alphanumeric instructional indicia.

21. The device of claim 16, wherein said electrically programmable display is a liquid crystal membrane display.

22. The device of claim 16, wherein said data generating elements are membrane type switches.

* * * * *